No. 677,520. Patented July 2, 1901.
T. A. KEOGH.
WHEEL SECURING DEVICE.
(Application filed Oct. 31, 1900.)
(No Model.)
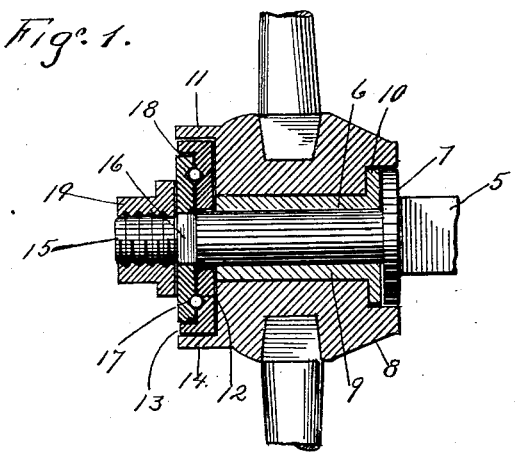
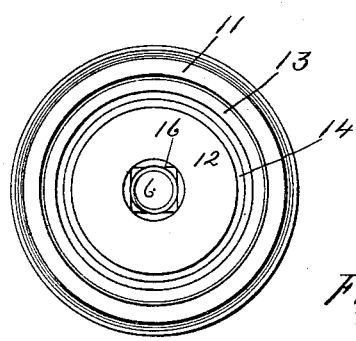
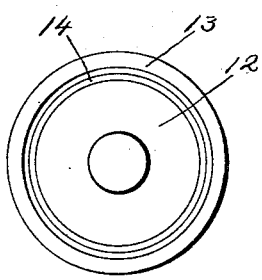
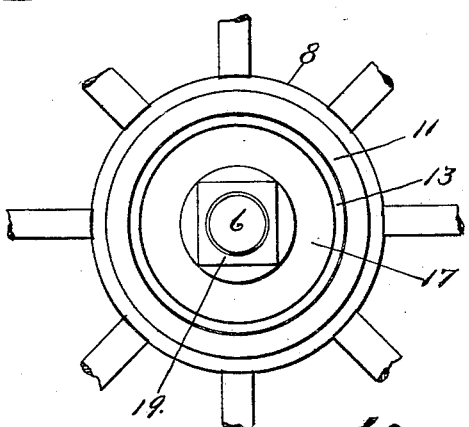
WITNESSES
INVENTOR
Thomas A. Keogh
BY
Edgar Tate Co
ATTORNEYS

UNITED STATES PATENT OFFICE.

THOMAS A. KEOGH, OF WEST HOBOKEN, NEW JERSEY.

WHEEL-SECURING DEVICE.

SPECIFICATION forming part of Letters Patent No. 677,520, dated July 2, 1901.

Application filed October 31, 1900. Serial No. 34,986. (No model.)

*To all whom it may concern:*

Be it known that I, THOMAS A. KEOGH, a citizen of the United States, residing at West Hoboken, in the county of Hudson and State of New Jersey, have invented certain new and useful Improvements in Devices for Securing Wheels on Axles, of which the following is a full and complete specification, such as will enable those skilled in the art to which it appertains to make and use the same.

This invention relates to wheels and axles; and the object thereof is to provide an improved device or devices for securing a wheel on an axle and which operates in the manner of a nut and lock; and with this and other objects in view the invention consists in the construction, combination, and arrangement of parts hereinafter described and claimed.

The invention is fully disclosed in the following specification, of which the accompanying drawings form a part, in which the separate parts of my improvement are designated by the same reference characters in each of the views, and in which—

Figure 1 is a central longitudinal section of the hub of a wheel mounted on the spindle of an axle and held in position thereon by means of my improved locking or securing devices; Fig. 2, an outside end view of the construction shown in Fig. 1, with the nut and a stationary washer which forms a part of the construction removed; Fig. 3, a similar view of a movable washer which forms a part of the construction; and Fig. 4, an end view complete looking in the direction of the arrow *a* in Fig. 1, Figs. 2, 3, and 4 being on an enlarged scale.

In the drawings forming part of this specification I have shown at 5 an ordinary axle provided with a spindle 6, and secured thereto or formed thereon at the inner end of the spindle are collars 7.

The hub 8 of the wheel is provided centrally with a sleeve 9, having at its inner end a flange or rim 10, which abuts against the collar 7, and said hub 8 is also provided at its outer end with a flange or rim 11, and mounted on the spindle 6 within the flange or rim 11 is a loose washer 12, the perimeter of which is provided with an annular outwardly-directed flange 13, and said washer is provided just within the flange 13 with an annular groove 14, which forms a part of a ball-race.

The outer end of the spindle 6 is screw-threaded in the usual manner, as shown at 15, and adjacent to the inner end of the screw-threaded portion 15 said spindle is annular in cross-section, as shown at 16, and in practice I mount on said annular portion 16 of the spindle 6 a washer 17, which is immovable in the operation of the wheel, and the inner side of the washer 17, adjacent to the perimeter thereof is provided with an annular groove 18, which, in connection with the annular groove 14 in the movable washer, forms a complete ball-race in which ball-bearings are placed.

A nut 19 is screwed onto the end of the spindle 6 in the usual manner and securely holds the wheel and the washers 12 and 17 in place, and the operation will be readily understood from the foregoing description when taken in connection with the accompanying drawings and the following statement thereof.

The washer 12 is free to turn in either direction, while the washer 17 is stationary, and it will be apparent from this construction that there is no tendency in the operation of the wheel to turn the nut 19 backwardly, as the washer 17 does not revolve. The device thus operates as a nut-lock and the wheel will be securely held on the spindle regardless of the direction in which it may be turned, and the ball-bearings between the washers 12 and 17 reduce the friction to a minimum.

In Fig. 2 the washer 17 and nut 19 are removed, and Fig. 3 is an outside view of the washer 12, while Fig. 4 is an outside view of the construction as shown in Fig. 1, all the washers and the nut 19 being in position.

Having fully described my invention, I claim as new and desire to secure by Letters Patent—

1. An axle provided with a spindle, the end of which is screw-threaded, and that portion thereof adjacent to the screw-threaded portion being angular in form, said spindle being also provided with a loose washer which is mounted thereon adjacent to said angular portion, and with a stationary washer mounted on said angular portion, and with a nut adapted to be screwed onto the threaded portion of said spindle, said washers being provided in their adjacent surfaces with grooves forming a ball-race, substantially as shown and described.

2. An axle provided with a spindle, the end of which is screw-threaded, and that portion thereof adjacent to the screw-threaded portion being angular in form, a wheel mounted on said spindle and the hub of which, at its outer end, is provided with an annular space formed by an annular flange, a loose washer mounted on said spindle within said annular flange, and provided at its perimeter with an outwardly-directed flange, a stationary washer mounted on the angular portion of said spindle adjacent to the loose washer, and a nut adapted to be screwed onto the threaded portion of the spindle and to bear on the stationary washer, substantially as shown and described.

3. An axle provided with a spindle, the end of which is screw-threaded, and that portion thereof adjacent to the screw-threaded portion being angular in form, a wheel mounted on said spindle and the hub of which, at its outer end, is provided with an annular space formed by an annular flange, a loose washer mounted on said spindle within said annular flange, and provided at its perimeter with an outwardly-directed flange, a stationary washer mounted on the angular portion of said spindle adjacent to the loose washer, and a nut adapted to be screwed onto the threaded portion of the spindle, and to bear on the stationary washer, said movable and said stationary washer being provided in their adjacent surfaces with grooves forming a ball-race, substantially as shown and described.

In testimony that I claim the foregoing as my invention I have signed my name, in presence of the subscribing witnesses, this 30th day of October, 1900.

THOMAS A. KEOGH.

Witnesses:
F. A. STEWART,
LOUIS A. GINDIRE.